(12) United States Patent
Holden et al.

(10) Patent No.: US 9,420,252 B2
(45) Date of Patent: Aug. 16, 2016

(54) METHODS AND SYSTEMS FOR TIME-SHIFTING CONTENT

(71) Applicant: Comcast Cable Communications, LLC, Philadelphia, PA (US)

(72) Inventors: Danial Holden, Denver, CO (US); Virgil Boyette Urquhart, Littleton, CO (US); Neal Roberts, Parkesburg, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 159 days.

(21) Appl. No.: 14/199,262

(22) Filed: Mar. 6, 2014

(65) Prior Publication Data

US 2014/0248038 A1 Sep. 4, 2014

Related U.S. Application Data

(63) Continuation of application No. 13/782,959, filed on Mar. 1, 2013, now Pat. No. 8,712,217.

(51) Int. Cl.

| | |
|---|---|
| *H04N 5/76* | (2006.01) |
| *H04N 5/78* | (2006.01) |
| *H04N 9/87* | (2006.01) |
| *H04N 5/783* | (2006.01) |
| *H04N 21/222* | (2011.01) |
| *H04N 21/231* | (2011.01) |

(Continued)

(52) U.S. Cl.
CPC . *H04N 9/87* (2013.01); *H04N 5/76* (2013.01); *H04N 5/783* (2013.01); *H04N 9/79* (2013.01); *H04N 21/222* (2013.01); *H04N 21/23106* (2013.01); *H04N 21/234363* (2013.01); *H04N 21/2625* (2013.01); *H04N 21/2747* (2013.01); *H04N 21/41407* (2013.01); *H04N 5/765* (2013.01)

(58) Field of Classification Search
CPC ......... H04N 5/76; H04N 5/783; H04N 5/765; H04N 9/79; H04N 9/87; H04N 21/222; H04N 21/23106; H04N 21/234363; H04N 21/2625; H04N 21/2747; H04N 21/41407
USPC .......... 386/298, 323, 324, 330, 248, 250, 249
See application file for complete search history.

(56) References Cited

U.S. PATENT DOCUMENTS 5,377,051 A * 12/1994 Lane .................... G11B 5/0086
348/E5.007
7,280,737 B2 10/2007 Smith
(Continued)

FOREIGN PATENT DOCUMENTS

| | | |
|---|---|---|
| CA | 2844317 | 9/2014 |
| EP | 2216991 A1 | 8/2010 |
| EP | 2773124 | 9/2014 |

OTHER PUBLICATIONS

Motorola, "Implementing follow me tv solutions," Solutions Paper, pp. 1-9 (2008).

(Continued)

*Primary Examiner* — Robert Chevalier
(74) *Attorney, Agent, or Firm* — Ballard Spahr LLP

(57) ABSTRACT

Methods and systems for providing data such as content are disclosed. A method can comprise receiving content, randomly shifting the received content, and providing the randomly shifted received content to a computing device.

20 Claims, 10 Drawing Sheets

(51) Int. Cl.
*H04N 21/2343* (2011.01)
*H04N 21/262* (2011.01)
*H04N 21/2747* (2011.01)
*H04N 21/414* (2011.01)
*H04N 9/79* (2006.01)
*H04N 5/765* (2006.01)

(56) References Cited

U.S. PATENT DOCUMENTS

| | | |
|---|---|---|
| 7,298,962 B2 | 11/2007 | Quan et al. |
| 7,876,998 B2 | 1/2011 | Wall et al. |
| 7,904,920 B2 | 3/2011 | Sung et al. |
| 8,108,257 B2 | 1/2012 | Sengamedu |
| 8,214,256 B2 | 7/2012 | Riedl et al. |
| 8,229,789 B2 | 7/2012 | Riedl et al. |
| 8,712,217 B1 | 4/2014 | Holden |
| 2003/0066078 A1 | 4/2003 | Bjorgan et al. |
| 2006/0031892 A1 | 2/2006 | Cohen |
| 2007/0115388 A1* | 5/2007 | Apelbaum ............ H04N 7/148 348/430.1 |
| 2008/0044154 A1 | 2/2008 | Quan et al. |
| 2008/0109840 A1 | 5/2008 | Walter et al. |
| 2008/0109857 A1 | 5/2008 | Goodwill et al. |
| 2009/0172723 A1 | 7/2009 | Shkedi et al. |
| 2009/0204541 A1 | 8/2009 | Zhuk et al. |
| 2010/0166389 A1 | 7/2010 | Knee et al. |
| 2011/0157471 A1 | 6/2011 | Seshadri et al. |
| 2012/0060194 A1 | 3/2012 | Alexander |
| 2012/0110616 A1 | 5/2012 | Kilar et al. |

OTHER PUBLICATIONS

Rousseau, F., et al. "Omnisphere: a personal communication environment," Proceedings of the 36th Hawaii International Conference on System Sciences, pp. 1-10 (2003).

Yi, C., et al. "Seamless user-level handoff in ubiquitous multimedia service delivery," Multimedia Tools and Applications, vol. 22, pp. 137-170 (2004).

European Search Report issued Jun. 24, 2014 for European Patent Applicatio No. 14156998.8, which was filed on Feb. 27, 2014 and published as EP 2773124 on Sep. 3, 2014 (Inventor—Holden; Applicant—Comcast Corp;) (pp. 1-6).

* cited by examiner

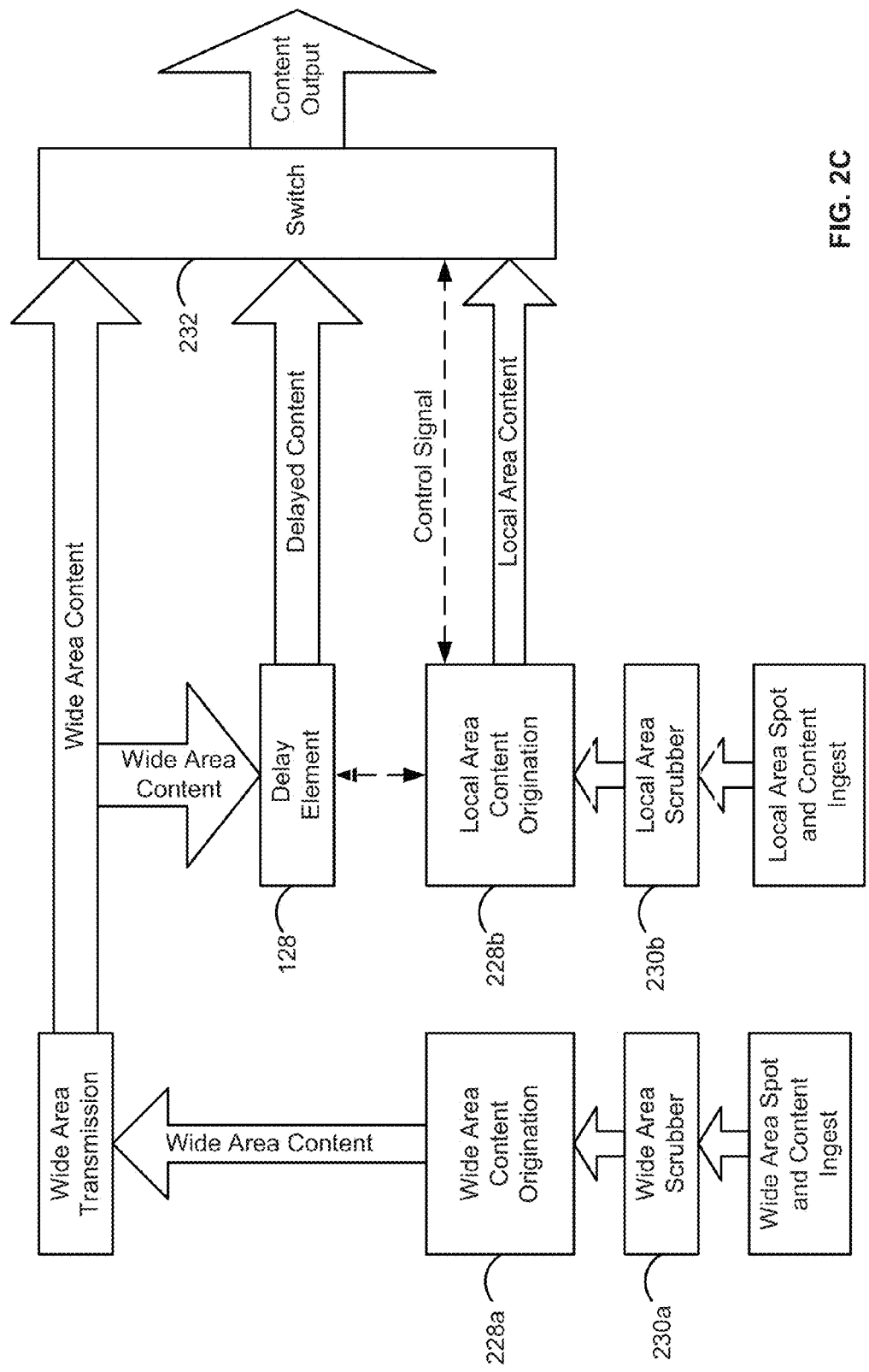

METHODS AND SYSTEMS FOR TIME-SHIFTING CONTENT

CROSS REFERENCE TO RELATED APPLICATION

This application claims priority to, and is a continuation of, U.S. patent application Ser. No. 13/782,959 filed on Mar. 1, 2013, herein incorporated by reference in its entirety.

BACKGROUND

When viewing content such as television programming, it is a common practice for the viewer to skip advertising content (e.g., by fast-forwarding through commercials). Additionally, certain devices or services can automatically skip advertisements or other content portions and provide ad-free content for viewing, which may be undesirable to certain parties. These and other shortcomings are addressed by the present disclosure.

SUMMARY

It is to be understood that both the following summary and the following detailed description are exemplary and explanatory only and are not restrictive, as claimed. Provided are methods and systems for, in one aspect, providing and controlling provision of content delivered to one or more devices. As an example, content can be time-shifted. As a further example, content can be time-shifted in order to circumvent an automated content manipulation process such as an advertisement skipping process.

In an aspect, methods can comprise generating time-shifted content based on received content. The received content can be provided to a first computing device. The first computing device can be associated with a first location identifier or classifier. The time-shifted content can be provided to a second computing device. The second computing device can be associated with a second location identifier or classifier. The first location identifier/classifier of the first computing device can be the same as the second location identifier/classifier of the second computing device.

In an aspect, methods can comprise receiving content. First time-shifted content can be generated based on the received content by inserting first content (e.g., shift content) having a first time duration. Second time-shifted content can be generated based on the received content by inserting second content (e.g., shift content) having a second time duration. The first time-shifted content can comprise a sequence of video that is different from a sequence of video of the second time-shifted content.

In an aspect, methods can comprise receiving content. The received content can be shifted according to a shifting pattern, such as randomly time-shifted pattern, a pattern that increases the time shift linearly (e.g., 1 min, 2 min, 3 min), or according to a normal distribution or pre-defined duration. The shifted content can be provided to a computing device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2C is a block diagram of an exemplary system.

DETAILED DESCRIPTION

Figure 1:
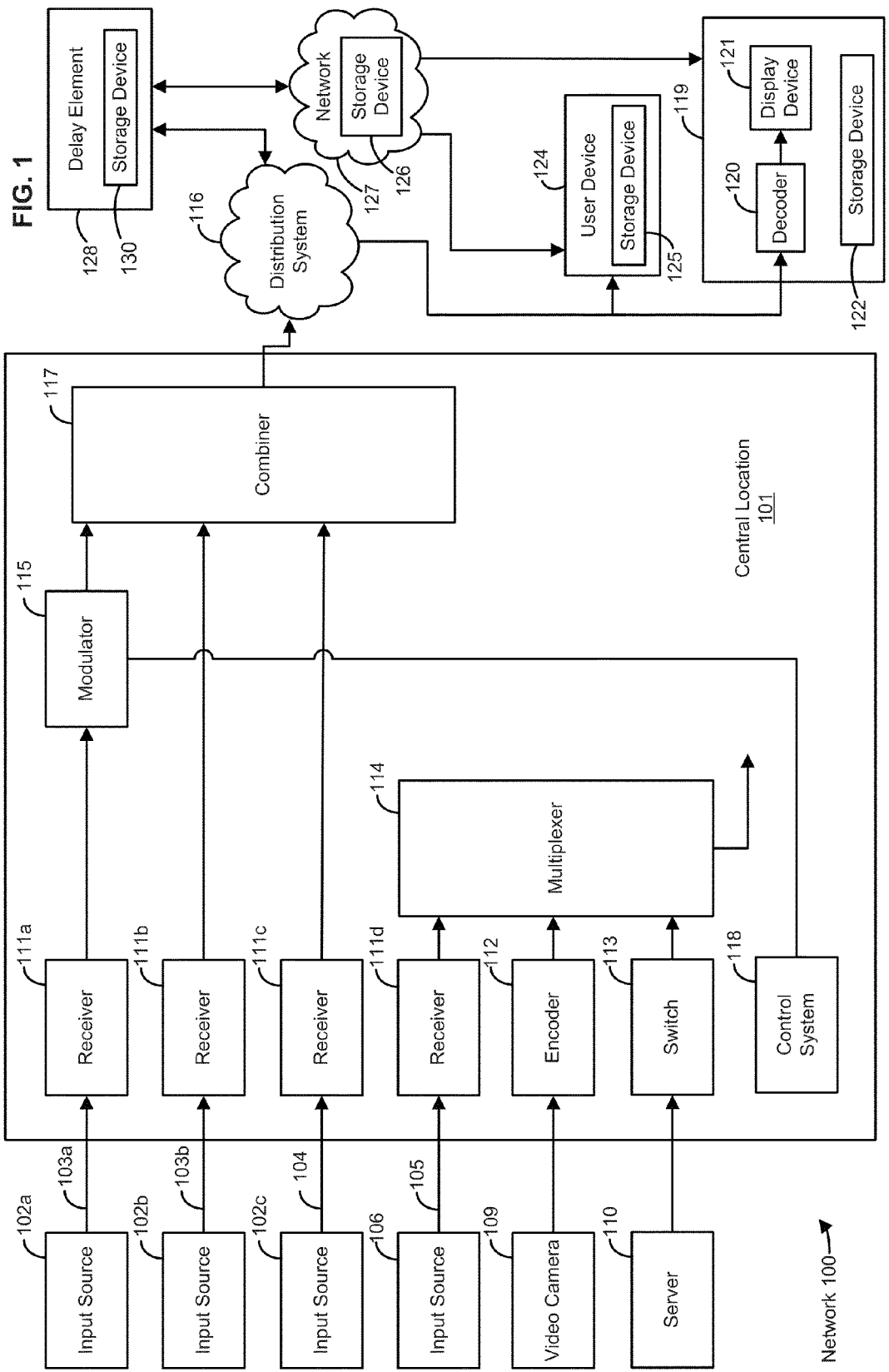
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for, in one aspect, providing and controlling provision of content to one or more devices. As an example, data such as content can be time-shifted, such as per-determined or randomly time-shifted and/or time-shifted based at least in part on a time shifting pattern (e.g., a pattern that increases the time shift linearly (e.g., 1 min, 2 min, 3 min), or according to a normal distribution or pre-defined duration).

Time shifting content and providing time-shifted content can be done for several reasons and purposes. For example, providing such content can be done for system or network testing purposes. In an aspect, providing such content can be done to test or identify, e.g., group, various devices based upon reception of content. As another example, content can be time-shifted in order to circumvent (e.g., defeat, render ineffectual for intended purpose, etc.) processes or manipulations from being applied to the content, e.g., by third parties, such as an automated content (e.g., advertisement) skipping process. As a further example, wide area (e.g., national, inter-regional, inter-market, inter-classification, etc.) data transmitted to local affiliates can be time-shifted. Such time shifting can cause an automated data manipulating process, such as an advertisement skipping process, to skip unintended portions of the data, such as national programming rather than advertisements. Accordingly, unwanted manipulation of data, such as time-dependent advertisement skipping processes and other data manipulation can be circumvented. However, as discussed above, content can be time-shifted for other purposes such as synchronizing or desynchronizing one or more devices, providing customized content for one or more computing devices, providing customized recording processes, and the like.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware. Although one or more figures illustrate television content type data, the disclosure can be practiced with any data.

The network 100 can comprise a central location 101 (e.g., a headend, or processing facility), which can receive content (e.g., data, input programming) from multiple sources. The central location 101 can combine the content from the various sources and can distribute the content to user (e.g., subscriber) locations (e.g., location 119) via distribution system 116.

In an aspect, the central location 101 can be a data processing facility configured to receive content from a variety of sources 102*a*, 102*b*, 102*c*. The content can be transmitted from the source to the central location 101 via a variety of transmission paths, including wireless (e.g. satellite paths 103*a*, 103*b*) and terrestrial path 104. The central location 101 can also receive content from a direct feed source 106 via a direct line 105. Content may also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111*a*, 111*b*, 111*c*, 111*d* that are each associated with an input source. For example, MPEG encoders, such as encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's, display devices 121, central locations 101, DVR's, home theater PC's, and the like. As an example, the decoder 120 can receive and process the embedded markers, flags, and signals in the content data stream for controlling a content received by the decoder 120.

In an aspect, the decoder 120 or communication terminal can comprise a storage device 122. As an example, the storage device 122 can comprise a memory or other storage medium. As a further example, a number of content assets (e.g., video, audio, etc.) can be loaded into the storage device 122 and stored for playback or processing by the associated decoder 120. However, other data, content, and/or information can be stored in the storage device 122 such as advertisements and alternative content, for example. In an aspect, the storage device 122 can be separate from the decoder 120. For example, the storage device 122 can be located upstream of the decoder 120 and downstream of the distribution system 116. As a further example, the storage device 122 can store information to be transmitted to any number of decoders 120 or other recipient devices. Accordingly, the decoder 120 can retrieve the content assets from the storage device 122 for playback without having to communicate with the distribution system 116, thereby reducing latency in playback. In an aspect, the decoder 120 can process a data stream, which can comprise audio, video, or other data from the distribution system 116 with a regular cadence (e.g., every two seconds, four seconds, ten seconds, and the like). Other data and tracks can be received and processed by the user devices.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be a CT, a set-top box, a television, a computer, a smartphone, a laptop, a tablet, a multimedia playback device, a portable electronic device, and the like. As an example, the user device 124 can be an Internet Protocol compatible device for receiving signals via a network such as the Internet or some other communications network for providing content to the user. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content therebetween. As a further example, the storage device 125 can be located remotely from the user device 124, such as network storage medium 126.

In an aspect, a delay element 128 can be in communication with one or more of the central location 101, the decoder 120, and the user device 124. The delay element 128 can be software, hardware, or a combination thereof. The delay element 128 can be located in one or more existing elements or it can be standalone. In another aspect, the delay element 128 can be configured to receive content such as incoming network programming or a network feed via the central location 101. As an example, while the incoming network programming is received by the delay element 128, a secondary source such as a local affiliate, can continue to transmit shift content (e.g., local programming, alternative content, advertisements, etc.) to one or more of the decoder 120 and the user device 124. Shift content can be any content, break, place holder or the like transmitted to effect a delay of other content being transmitted and/or presented. As a further example, once a delay time has expired, delayed network programming can be transmitted to one or more of the decoder 120 and the user device 124. As such, the shift content can be replaced with the delayed network programming.

In an aspect, the incoming network programming can be transmitted to a local affiliate (e.g., a device or system for managing a subset of a larger group) and the local affiliate can generate appropriate time-shifted programming (e.g., delayed network programming) via one or more of the local traffic/billing system and the master control/automation system. The result of the time shift can be to circumvent any mechanism used by a device that uses timing information to skip advertising. In another aspect, other processes can be used to circumvent advertisement skipping technology. The result of the time shift can be to format content to enable more efficient content recording and/or content distribution. As an example, certain advertisement skipping technology can identify advertisements by detecting missing closed caption, missing SAP, missing bug, a dip in audio, an I-Frame, and/or fingerprinting the programming for comparative detection. As another example, such advertising skipping technology can be circumvented by adding closed captioning data to an advertisement, adding SAP, inserting a bug, smoothing audio transitions relating to advertisements, starting advertisements on alternative frame (e.g., not I-frame), and/or modifying content edges during encoding/re-encoding to manipulate the fingerprint. As a further example, closed captioning data can be manipulated and/or audio relating to an advertisement can be manipulated to "fool" a detector. Other processes and mechanisms can be used to circumvent advertisement skipping technology.

In an aspect, the delay element 128 can be associated with and/or can comprise a storage device 130. As an example, the storage device 130 can comprise a memory or other storage medium. As a further example, a number of content assets (e.g., video, audio, etc.) can be loaded into the storage device 130 and stored for transmission or processing by the delay element 128. However, other data, content, and/or information can be stored in the storage device 130 such as advertisements and alternative content, for example. In an aspect, the storage device 122 can be separate from the delay element 128 and accessible thereby.

Figure 2A:
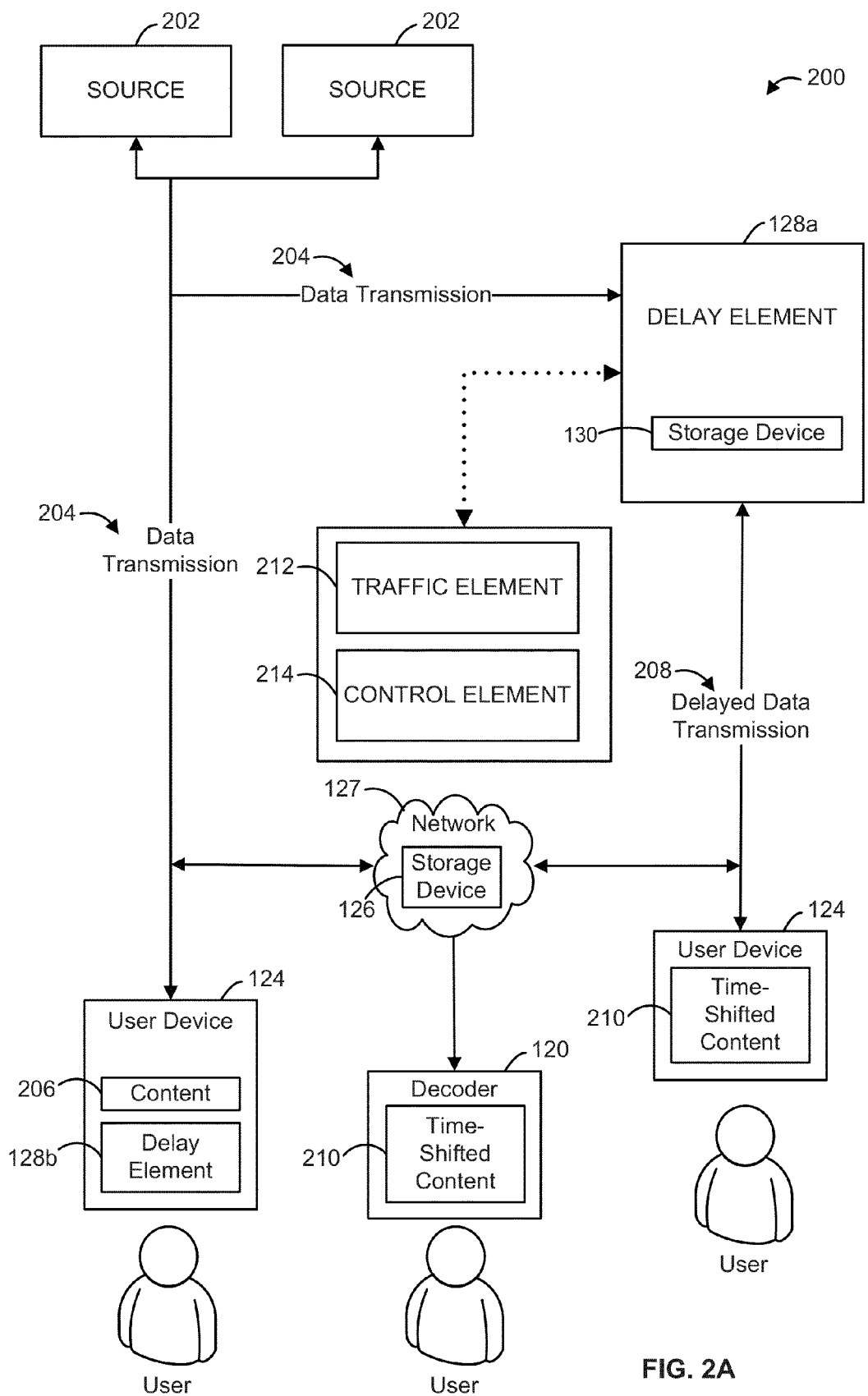
FIG. 2A is a block diagram of an exemplary system.

FIG. 2A is a block diagram of an exemplary content control system 200. The system 200 can comprise one or more data sources 202 for accessing, storing, and/or transmitting data, e.g., a transmission of file-based data. As an example, one or more of the sources 202 can be a large area (wide area), such as a national programming source, or a small area (local area) such as a local programming source (e.g., local affiliate). In an aspect, one or more of the sources 202 can comprise content delivery networks (CDN). In another aspect, the data sources 202 can comprise a content provider (e.g., provider of audio content, video content, data services, news and programming, advertisements, alternate content, etc.) configured to transmit the data (e.g., as content assets via a stream, fragments, files, etc.) to various end-users. In an aspect, one or more data sources 202 can comprise a supplemental content database. In another aspect, the supplemental content database can comprise an advertisement or alternate content database (e.g., second screen content) having a plurality of advertisements stored therein or capable of accessing advertisements stored elsewhere. As an example, the advertisement database can comprise a plurality of video advertisements, which can be interactive or other types of advertisements. As a further example, the plurality of video advertisements can each have a particular time duration associated therewith. In an aspect, the time duration associated with the advertisements, alternate, and/or supplemental content can be varied in duration. As an example, a particular advertisement can have multiple versions, wherein each version of the same advertisement can have a different time duration. Accordingly, an advertisement having a particular time duration can be retrieved to fill a time slot having a substantially equal time duration. Any item of content is sources 202 can be retrieved or transmitted to the end user.

In an aspect, one or more sources 202 can process and/or transmit data 204 to one or more network devices such as user devices 124 and/or decoders 120. As another example, a storage medium facilitates storage of at least a portion of the data 204 such as by network storage device 126. Any portion of the data 204 can be stored locally to a receiving device (e.g., user device 124, decoder 120, etc.) or remotely from the receiving device. As a further example, the receiving device can process the data 204 to provide (e.g., present on a display) content 206 to a user. In an aspect, content 206 that is provided based on a processing (e.g., rendering or otherwise presenting) of the data 204 can be substantially similar to content provided to other devices and users receiving and/or processing the same data 204 or copies thereof. As an example, a large area, e.g., national programming feed, can be transmitted to multiple local affiliates (e.g., servicing cities or metropolitan areas) for distribution to local devices. As a further example, the local affiliates can be equipped to control the transmission of data (e.g., data feed 204) to one or more devices associated with the local affiliate. As such, the local affiliate can provide content 206 based on one or more of the data feed 204, local programming, local advertisements, stored data, national programming, alternative programming, and the like.

In an aspect, one or more delay elements 128a, 128b can be in communication with one or more of the sources 202, the decoder 120, and the user devices 124. As an example, delay element 128b can be co-located and/or integrated with one or more of the sources 202, the decoder 120, and the user devices 124. One or more delay elements 128a, 128b can be disposed in any location or part of any network architecture. In another aspect, the delay element 128 can be configured to receive the data 204, such as incoming network programming or any data feed, via one or more sources 202. As an example, the delay elements 128a, 128b can delay transmission of the data 204 to one or more of the decoders 120 and/or the user devices 124. As another example, a storage medium such as storage device 130 can facilitate storage (e.g., in a buffer or more permanent storage) of at least a portion of the data 204 in order to effect delay of transmission of the data 204. In an aspect, once a delay time has expired, delayed data 208 can be transmitted to one or more of the decoder 120 and/or the user devices 124. As such, the recipient device can process the delayed data 208 to provide time-shifted content 210. As an example, the delayed data 208 can be stored for subsequent transmission to one or more of the decoder 120 and/or the user devices 124, such as by network storage device 126. In a further aspect, a device, such as one or more of the decoder 120 and/or the user devices 124, presenting one or more of the content 206 and the time-shifted content 210 can be associated with a location identifier or classification such as time zone, zip code, area, code, IP address, MAC address, region, class of user/device/service, a type of content, a type of receiving device, a boundary (real or defined) between two locations or any other criteria. A region can comprise a geographically defined area as a subset of a larger area. A class of user/device/service can comprise a classification of one or more users, devices, or services to distinguish the same from other users, devices, services, based on entitlements, priorities, types of payloads being delivered, or the like. A type of receiving device can comprise a make, model, serial number, processing capability, compatibility, version, addressable identifier, and the like. As an example, a device providing the content 206 can be classified with the same location identifier or classification as a device providing the time-shifted content 210. Devices providing the content 206 and/or the time-shifted content 210 can be located in any location and can be classified by any classifier or identifier.

Figure 3A:
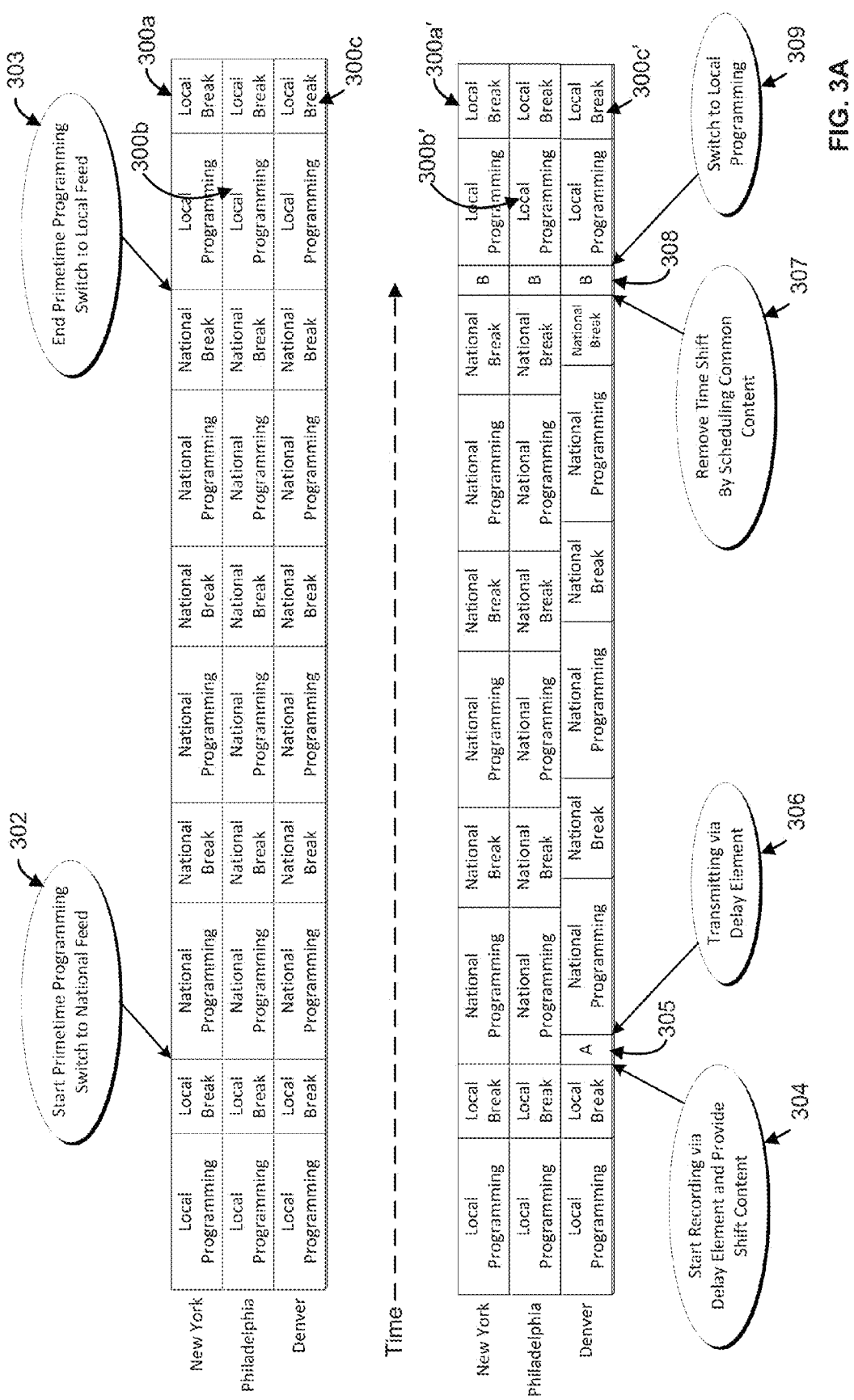
FIG. 3A is a representation of exemplary content timelines.

In an aspect, one or more devices associated with a class of service, geo-location, particular region or bounded location, market or service area, and/or location identifier or classifier can receive a substantially similar sequence of data such as video. As an example, with reference to FIG. 3A, timelines 300a, 300b, 300c represent substantially similar sequences of data provided to particular geographic areas or groupings of devices. In FIG. 3A, metropolitan areas New York, Philadelphia, and Denver are shown only as examples of such areas or groupings. Such a sequence of data can be processed to result in the presentation (e.g., linear presentation, time dependent presentation, etc.) of information such as content based upon the sequence of data. In the example shown in FIG. 3A, the areas or groupings represent a plurality of local markets (e.g., geographically grouped areas such as New York. Philadelphia, Denver, etc.). The sequences of data can comprise one or more types of data such as wide area (e.g., national, inter-region, inter-market, inter-classification, etc.) programming, national breaks (e.g., breaks for advertisements or other data), local programming, and local breaks. Each of the local markets can provide customized local programming and local breaks (e.g., breaks intended for small areas or local area coverage) that are specific to the local market. However, the national programming and national breaks (e.g., breaks intended for large areas or wide area coverage) can be identical in content.

As shown in FIG. 3A, timelines 300*a*, 300*b*, 300*c* can comprise a time-dependent transition to a first content source such as a wide area or national feed, at 302. In an aspect, the first content source can provide a common content. The common content can be routed to a number of devices such as a by a common or centralized source or multiple sources transmitting the same content. As an example, each of the devices can present the common content in a similar manner regardless of location. In another aspect, timelines 300*a*, 300*b*, 300*e* can comprise a time-dependent transition to a second content source such as a local feed, at 303. In an aspect, the second content source can be the same or different for each device receiving the local feed. As an example, content provided to a first device can be dependent upon a location of the first device. As another example, content provided to a second device can be dependent upon a location of the second device. As a further example, content provided to a second device can be different from the content provided to the first device.

In another aspect, one or more of the sequences of data can be time shifted, as shown by timeline 300*c*'. As an example, the sequence of data can be modified by delaying the transmission of one or more types of data, e.g., wide area or national programming, national breaks (e.g., advertisements), local programming, and local breaks, thereby generating a data sequence similar to timeline 300*c*'. As another example, the delay elements 128*a*, 128*b* (e.g., a computing device configured to delay transmission of data) can store the data 204 such as national programming and/or national breaks, at 304. While the data 204 is received by one or more of the delay elements 128*a*, 128*b*, a secondary source such as a local affiliate, can continue to transmit secondary content 305 (e.g., local programming, alternative content, advertisements, shift content, etc.) to one or more devices in the local market (or another group of devices) associated with timeline 300*c*'. As shown in FIG. 3A, the secondary content 305 can be inserted shift content block A. As a further example, once a delay time period has expired, the delayed network programming can be transmitted to one or more devices in the local market associated with timeline 300*c*', at 306. As such, the delayed network programming can be presented to one or more devices at a different time than other devices, for example, resulting in time-shifted content being provided to a select group of devices. As an example, certain local markets can be provided the content timeline 300*a*', 300*b*', while the same or other local markets can be provided the time-shifted content timeline 300*c*'. The result of the time shift can be, for example, to circumvent any device that is using timing information to skip data such as advertising. Time shifting can be applied to any device, group of devices, market, region, classification of devices or users, and the like. Time shifting can be discretely and/or randomly applied to any portion of data being transmitted from a national, international, or local source. The time shifted delay can be random and/or pre-defined. As shown in FIG. 3A, timelines 300*a*', 300*b*', 300*c*' can comprise a time-dependent switch to a common content 308, at 307. Common content, such as content block B, can comprise advertisements, secondary content, shift content, programming, and the like. In an aspect, common content can be routed to a number of devices such as a by a common or centralized source or multiple sources transmitting the same content. As an example, each of the devices can present the common content in a similar manner regardless of location. In another aspect, timelines 300*a*', 300*b*', 300*c*' can comprise time-dependent switch to location dependent content source such as a local feed, at 309. In an aspect, the location dependent content source can be the same or different for each device receiving the local feed. As an example, content provided to a first device can be dependent upon a location of the first device. As another example, content provided to a second device can be dependent upon a location of the second device. As a further example, content provided to a second device can be different from the content provided to the first device.

Figure 3B:
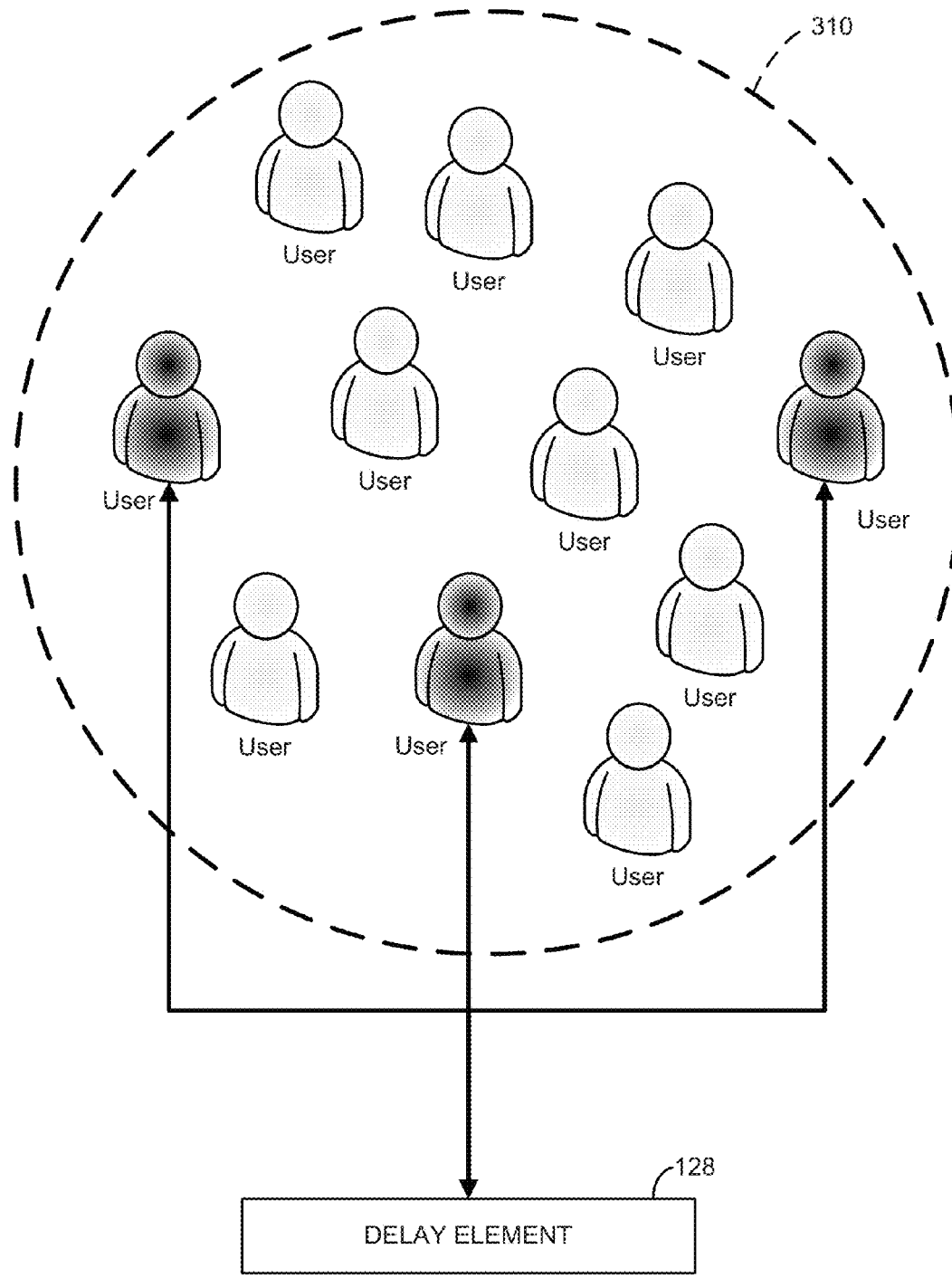
FIG. 3B is a representation of an exemplary network.

As shown in FIG. 3B, time-shifted content can be provided to one or more (as shown), or all of the devices or users that have the same location identifier or classifier 310 such as a time zone, address, market, region, or the like. Time-shifted content can be randomly provided to one or more users and/or devices. As an example, shift content (e.g., local programming, alternative or supplemental content, advertisements, etc.) can be randomly inserted into a sequence of content transmitted to one or more devices. Time-shifted content can be provided to one or more users and/or device based on a time shifting pattern, such as a pre-determined pattern, a statistical pattern, a random pattern, and the like.

Figure 3C:
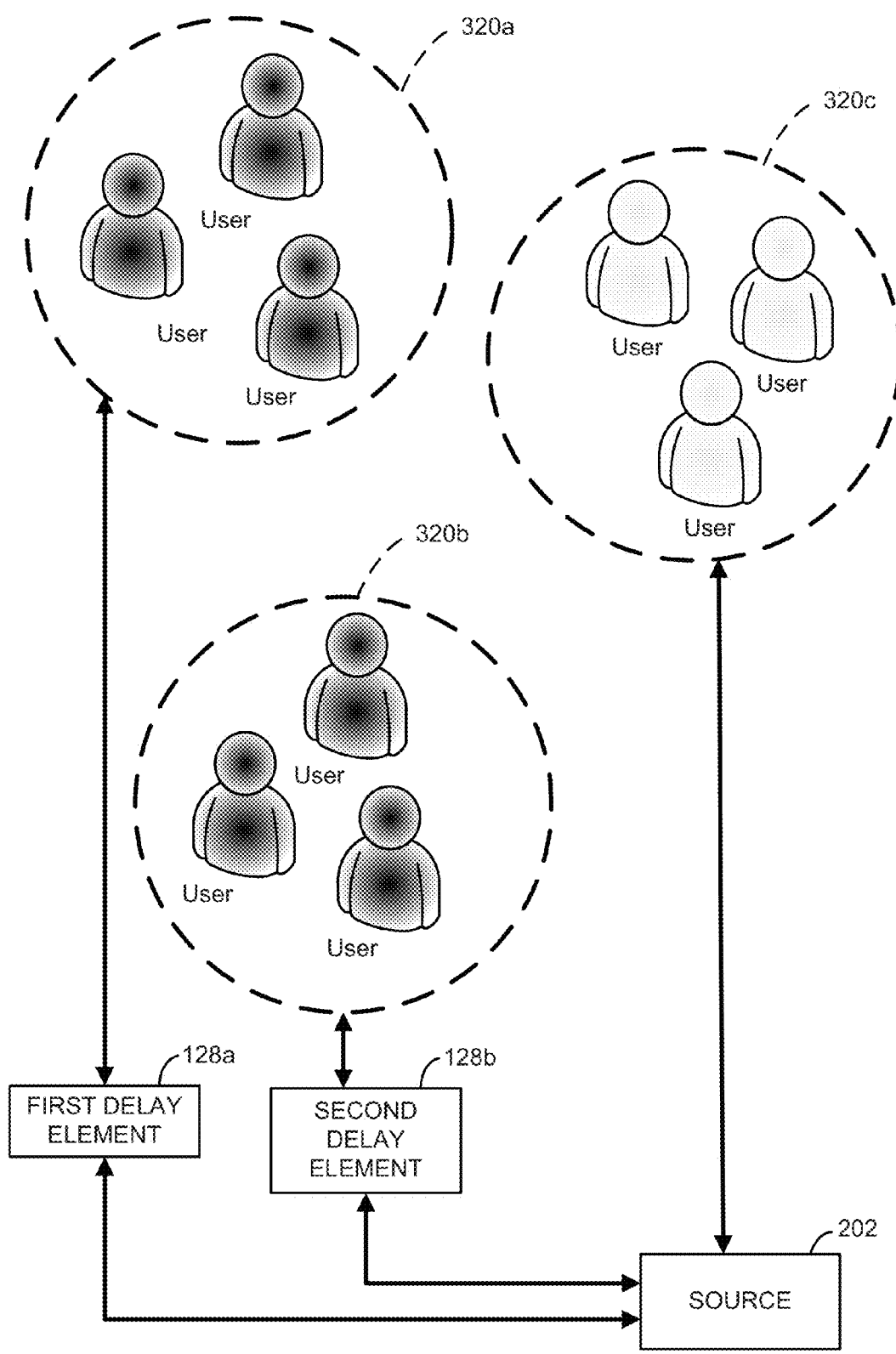
FIG. 3C is a representation of an exemplary network.

As shown in FIG. 3C, delay elements 128*a*, 128*b* can be configured to selectively provide time-shifted content to one or more devices or users (as shown). As an example, time-shifted content can be selectively provided to one or more devices or users associated with a first identifier 320*a*, such as a time zone, market, region, class of service, or the like. As another example, time-shifted content can be selectively provided to one or more devices or users associated with a second classifier 320*b*, such as a time zone, market, region, class of service, or the like. As a further example, content that has not been time-shifted as for devices associated the first and/or second identifier 320*a*, 320*b* can be selectively provided to one or more devices or users associated with a third classifier 320*c*, such as a time zone, market, region, class of service, or the like.

Returning to FIG. 2A, the delay element 128 can be controlled by or can receive instructions from one or more of a traffic element 212 and a control element 214. In an aspect the traffic element 212 can be configured to schedule content and/or advertising to be transmitted or distributed in a live, linear fashion, sell advertising, manage advertising inventory, create invoices for transmitting advertising, provide an interface to the control element 214, and/or provide an interface for playout such as transmission of data intended for presentation. In another aspect, the control element 214 such as a master control can be configured as a control plane for video switching, graphics, and/or on-air/channel branding (bugs). The control element 214 can also be configured to control the delay element 128 and/or equipment in the content origination facility (e.g., content origination 218*a*, 218*b* (FIG. 2B)).

Figure 2B:
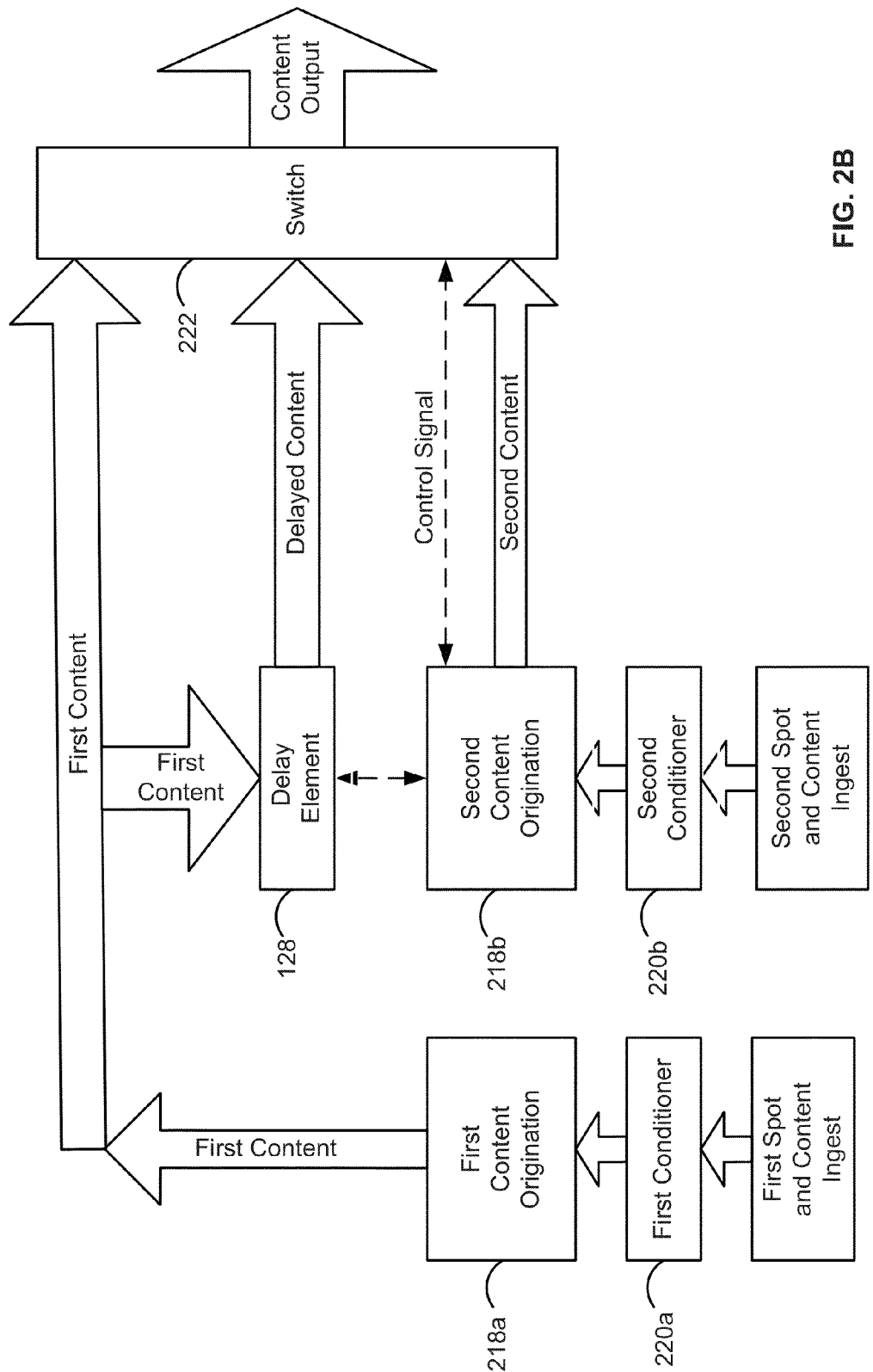
FIG. 2B is a block diagram of an exemplary system.

FIG. 2B illustrates an exemplary process flow diagram for content transmission. There are various aspects and embodiments of the present disclosure that can be used to introduce time shifting of video and other types of content. In an exemplary aspect, time-shifting management of first content and second content can be accomplished by the introduction of a delay by a computing device and/or software (e.g., delay element 128) in the system and network architecture of a content delivery from sources such as content origination facilities 218*a*, 218*b*, as illustrated in FIG. 2B. In another aspect, a first conditioning device 220a and/or second conditioning device 220b, such as a scrubber, can be configured to condition content, such as by adding content, manipulating closed captioning, SAP, bug placement, audio levels, frame organization, and/or content edges. As an example of undesired content manipulation, certain advertisement skipping technology can identify advertisements by detecting missing closed caption, missing SAP, missing bug, a dip in audio, an I-Frame, and/or fingerprinting the programming for comparative detection. As such, such advertising skipping technology can be circumvented by adding data or content such as closed captioning data to an advertisement, adding SAP, inserting a bug, smoothing audio transitions relating to advertisements, starting advertisements on alternative frame (e.g., not an I-frame), and/or modifying content edges during encoding/re-encoding to manipulate the fingerprint. As a further example, closed captioning data can be manipulated and/or audio relating to an advertisement can be manipulated to "fool" a detector. Other processes and mechanisms can be used to circumvent advertisement skipping technology.

In a further aspect, a device that receives and outputs content, such as a switch 222, can be configured to receive one or more inputs such as the first content, delayed content, the second content, and the like. As an example, the switch 222 can be configured to control a content output to one or more receiving devices based upon one or more of the inputs, and/or based upon the identifier/classifier of the receiving devices. As an example, the switch 222 can be controlled to manipulate the sequencing of data presented to one or more devices. As a further example, the switch 222 can be controlled by one or more elements associated with the content origination facilities 218a, 218b.

FIG. 2C illustrates an exemplary process flow diagram for content transmission. There are various aspects and embodiments of the present disclosure that can be used to introduce time shifting of video and other types of content. In an exemplary aspect, time-shifting management of wide area (e.g., national, inter-market, inter-region, inter-classification, etc.) and local area (e.g., local affiliate, market, region, classification, etc.) content can be accomplished by the introduction of a delay by a computing device and/or software (e.g., delay element 128) in the system and network architecture of a content delivery from sources such as content origination facilities 228a, 228b, as illustrated in FIG. 2C. In another aspect, a wide area conditioning device 230a and/or local area conditioning device 230b, such as a scrubber, can be configured to condition content, such as by adding content, manipulating closed captioning, auxiliary audio channel (e.g., SAP), bug placement, audio levels, frame organization, and/or content edges. As an example of undesired content manipulation, certain advertisement skipping technology can identify advertisements by detecting missing closed caption, missing SAP, missing bug, a dip in audio, an I-Frame, and/or fingerprinting the programming for comparative detection. As such, such advertising skipping technology can be circumvented by adding data or content such as closed captioning data to an advertisement, adding auxiliary audio (e.g., SAP), inserting a bug, smoothing audio transitions relating to advertisements, starting advertisements on alternative frame (e.g., not an I-frame), and/or modifying content edges during encoding/re-encoding to manipulate the fingerprint. As a further example, closed captioning data can be manipulated and/or audio relating to an advertisement can be manipulated to "fool" a detector. Other processes and mechanisms can be used to circumvent advertisement skipping technology.

In a further aspect, a device that receives and outputs content, such as a switch 232, can be configured to receive one or more inputs such as a wide area input, a delayed input, and a local area input. As an example, the switch 232 can be configured to control an output to one or more receiving devices based upon one or more of the inputs, and/or based upon the identifier/classifier of the receiving devices. As an example, the switch 232 can be controlled to manipulate the sequencing of data presented to one or more devices. As a further example, the switch 232 can be controlled by one or more elements associated with the content origination facilities 228a, 228b.

Figure 4A:
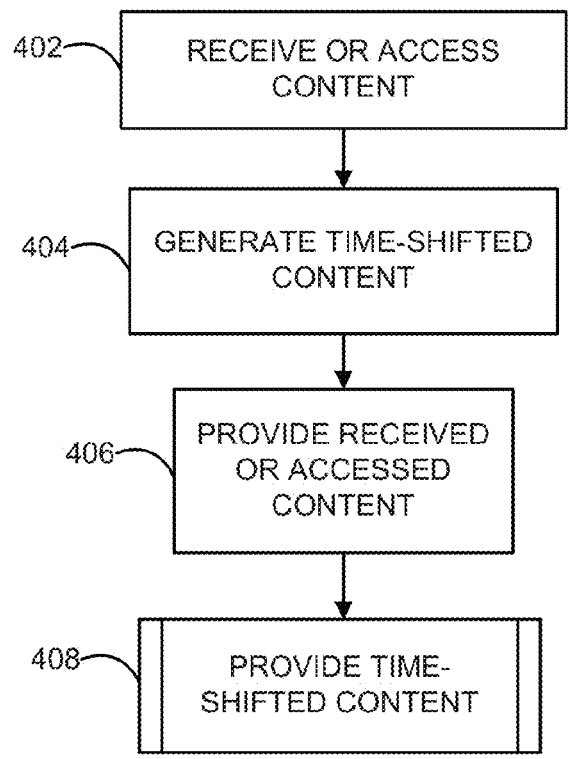
FIG. 4A is a flow chart of an exemplary method.

FIG. 4A illustrates an exemplary method for content placement. In step 402, data such as content can be received or accessed. As an example, the data can be received by a data source, such as data sources 202. As another example, the data can relate to one or more of a wide area content, national content program, national advertisement, local area content, local content program, local advertisement, or a combination thereof. As a further example, the received data can comprise a sequence of video.

In step 404, time-shifted data can be generated. In an aspect, the time-shifted data, such as content, can be generated (e.g., by inserting content, delaying content, etc.) based on the data received in step 402. As an example, the time-shifted data can comprise content, such as wide area content, national content program, national advertisement, local content program, local area content, local advertisement, or a combination thereof. As another example, the time-shifted data can be generated at a central location, delay element, or a local control element, or a combination thereof. As a further example, the time-shifted data can comprise a sequence of video. As yet another example, the sequence of video of the time-shifted data can be different from the sequence of video of the data received in step 402.

In step 406, the received data can be provided to a first computing device. In an aspect, the first computing device can be associated with a first location identifier/classifier. As an example, the first computing device can comprise a CT, a user device, a receiver, a display, or the like. As a further example, the first location classifier can comprise information relating to a region, market, geo-location, class of user, service area, or a combination thereof.

In step 408, the time-shifted data can be provided, for example, to one or more devices. As an example, time-shifted data can be provided as shown and discussed relative to FIGS. 3A-3C. In an aspect, the time-shifted data can be provided to a second computing device. The second computing device can be associated with a second location identifier/classifier. As an example, the second computing device can comprise a CT, a user device, a receiver, a display, or the like. As a further example, the second location classifier can comprise information relating to a region, market, geo-location, class of user, service area, or a combination thereof. In another aspect, the first location classifier of the first computing device can be the same as the second location classifier of the second computing device. As an example, the first computing device and the second computing device can be located (or recognized as being located) in the same time zone. As a further example, the first computing device and the second computing device can be located in different time zones.

Figure 4B:
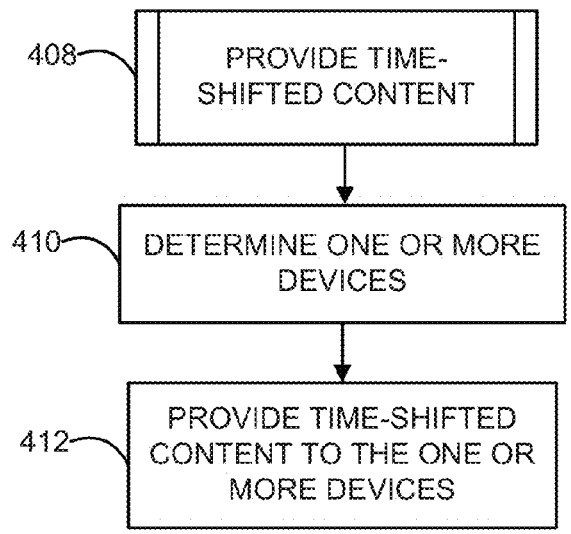
FIG. 4B is a flow chart of an exemplary method.

In another aspect, the time-shifted data can be transmitted to one or more devices. As an example, the one or more devices can be determined (e.g., selected, designated, identified, etc.), in step 410 (FIG. 4B). In an aspect, the one or more devices can be determined based upon one or more identifiers or classifications of the one or more device. As an example, devices can be determined based upon a location identifier, wherein devices sharing a first location identifier can be selected, while devices sharing a second location identifier are not selected. Any identifier or classification can be used to determine one or more devices. As a further example, the one or more devices can be randomly determined or determined based upon a pattern such as statistical pattern (e.g., historical pattern, a pattern that increases the time shift linearly, or according to a normal distribution or pre-defined duration.). In step 412, the time-shifted data can be provided to the one or more devices determined in step 410.

Figure 5:
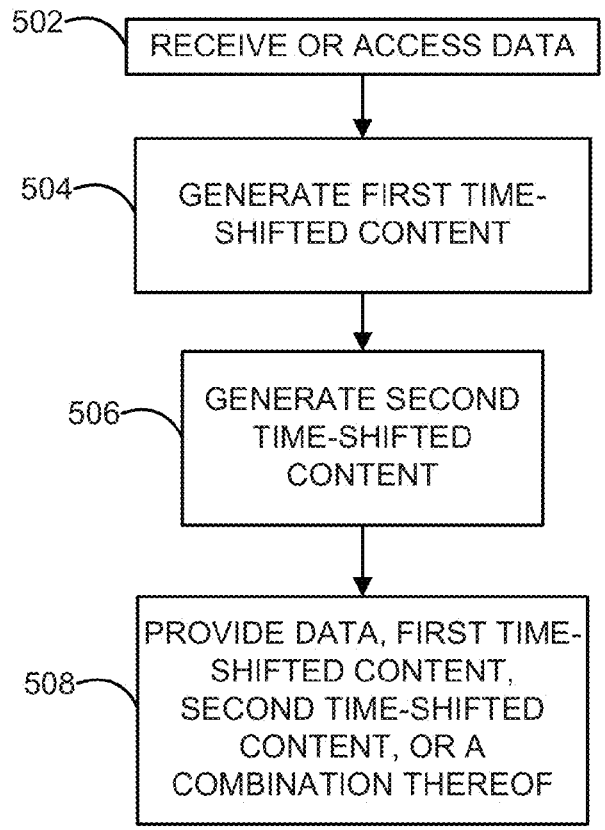
FIG. 5 is a flow chart of an exemplary method.

FIG. 5 illustrates another exemplary method for content placement. In step 502, data such as content can be received or accessed. As an example, the data can be received by a data source such as data sources 202. As another example, the data can relate to one or more of a national content program, national advertisement, local content program, local advertisement, or a combination thereof. As a further example, the received content can comprise a sequence of video.

In step 504, first time-shifted data can be generated, e.g., by inserting content, delaying transmission of content, etc. In an aspect, the first time-shifted data, such as content, can be generated based on the data received in step 502. As an example, the first time-shifted data can be related to content such as a national content program, national advertisement, local content program, local advertisement, or a combination thereof. As another example, the first time-shifted data can be generated at a central location, delay element, or a local control element, or a combination thereof. As a further example, the first time-shifted data can comprise a sequence of video. As yet another example, the sequence of video of the first time-shifted data can be different from the sequence of video of the data received in step 502. In another aspect, first time-shifted data can be generated by inserting (e.g., randomly or selectively) first shift data into the sequence of video of the data received in step 502. First time-shifted content can be generated by deleting content and/or replacing content with shift content. First time-shifted content can be generated by adding content without removing content. As an example, the first shift data can have a first time duration. As another example, the first shift data can be inserted by a delay element. As a further example, the first shift content can comprise an advertisement, local programming, alternative content, and the like.

In step 506, second time-shifted data can be generated. In an aspect, the second time-shifted data, such as content, can be generated based on the data received in step 502. As an example, the second time-shifted data can relate to content such as national content program, national advertisement, local content program, local advertisement, or a combination thereof. As another example, the second time-shifted data can be generated at a central location, delay element, or a local control element, or a combination thereof. As a further example, the second time-shifted data can comprise a sequence of video. As yet another example, the sequence of video of the second time-shifted data can be different from the sequence of video of the data received in step 502. Having a different sequence of video can comprise having a different arrangement of video assets (e.g., frames, blocks, fragments, programs, breaks, etc.) and/or having different time durations for the same video assets. In another aspect, second time-shifted data can be generated by inserting (e.g., randomly or selectively) second shift data into the sequence of video of the data received in step 502. Second time-shifted content can be generated by deleting content and/or replacing content with shift content. Second time-shifted content can be generated by adding content without removing content. As an example, the second shift data can have a second time duration. As another example, the second shift data can be inserted by a delay element. As a further example, the second shift content can comprise an advertisement, local programming, alternative content, and the like. As yet another example, the first time-shifted can comprise a sequence of video that is different from a sequence of video of the second time-shifted data. In an aspect, the first and second time-shifted content can be the same or different.

In step 508, one or more of the first time-shifted data and the second time-shifted data can be provided to a computing device. As an example, time-shifted data can be provided as shown and discussed relative to FIGS. 3A-3C. In an aspect, the computing device can comprise a first location classifier. As an example, the computing device can comprise a CT, a user device, a receiver, a display, or the like. As a further example, the location classifier can comprise information relating to a region, market, geo-location, class of user, service area, or a combination thereof.

Figure 6:
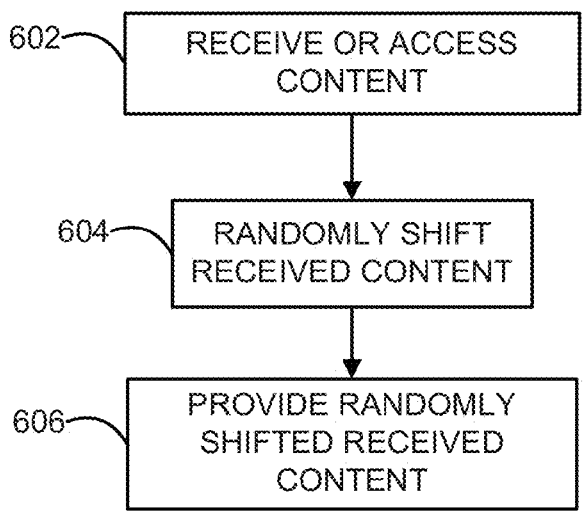
FIG. 6 is a flow chart of an exemplary method.

FIG. 6 illustrates an exemplary method for content placement. In step 602, data such as content can be received or accessed. As an example, the data can be received by a data source such as data source 202. As another example, the data can relate to one or more of a national content program, national advertisement, local content program, local advertisement, or a combination thereof. As a further example, the received content can comprise a sequence of video.

In step 604, the data received in step 602 can be randomly shifted. In an aspect, shift data can be inserted into a sequence of video of the data received in step 602. As an example, the random shifting of the data can comprise randomly shifting breaks such as national breaks. As a further example, random shifting can be implemented by affiliates. In an aspect, each affiliate can determine an amount of time to delay the national feed, thereby creating a gap in the sequence of video. Accordingly, the affiliate can be responsible for filling the gap in programming. Additionally, the delayed national video feed can be recorded for subsequent delivery. Once the determined amount of time delay has expired, the recorded national video feed can be transmitted. In another aspect, the national content provider can introduce the delay in content. In yet another aspect, randomly shifting content can comprise the random insertion, removal, and/or replacement of a portion of a content asset, content stream, content transmission, or the like. As an example, a random generator (e.g., processor, software, etc.) can determine a time duration and a shift content having a time duration that is substantially similar or the same as the randomly determined time duration can be inserted in a sequence of content. The time duration can be any time duration such as ten seconds, thirty seconds, one minute, five minutes, etc. The random generator can be any device or logical element configured to generate and/or select random time durations. As such, the portion of the sequence of content following the inserted shift content will be shifted as compared to the original, un-shifted sequence. Shift content can also be randomly inserted into a sequence of content, such as randomly selecting a break having a first time duration and inserting a replacement break with a second, different time duration. Other randomizing techniques can be implemented.

In step 606, the time-shifted data can be provided to one or more computing devices. As an example, time-shifted data can be provided as shown and discussed relative to FIGS. 3A-3C. In an aspect, the computing device can be associated with a location classifier. As an example, the computing device can comprise a CT, a user device, a receiver, a display, or the like. As a further example, the location classifier can comprise information relating to a region, market, geo-location, class of user, service area, or a combination thereof. In another aspect, the time-shifted data can be randomly provided to a select number of computing devices. As an example, a plurality of computing devices can be identified and a subset thereof can be randomly selected to receive the time-shifted data. Other selective transmission techniques can be used.

In an aspect, the methods and systems disclosed can utilize one or more computers to perform one or more functions in one or more locations. In an exemplary aspect, the methods and systems can be implemented on a computing system 701 as illustrated in FIG. 7 and described below.

Figure 7:
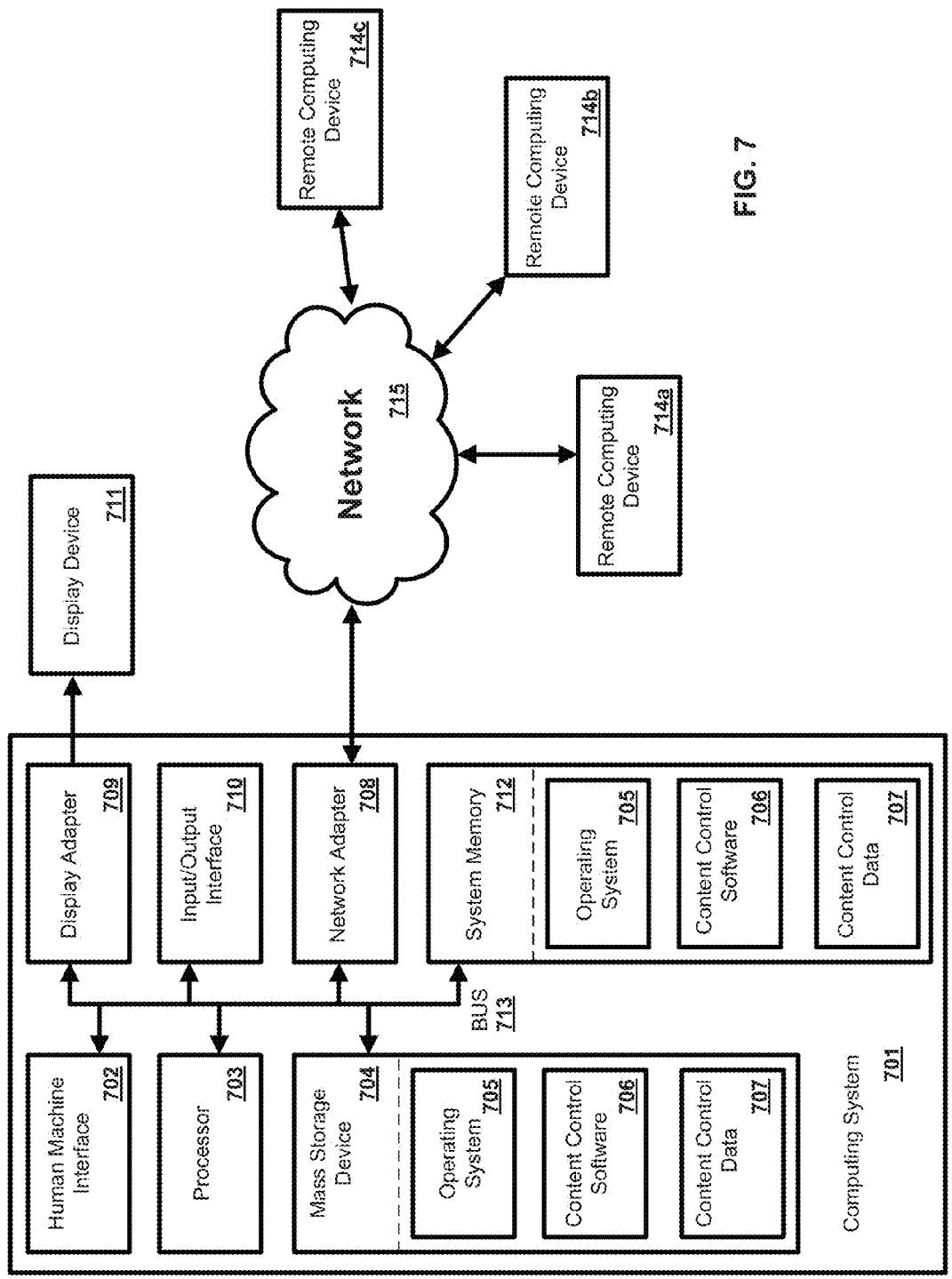
FIG. 7 is a block diagram of an exemplary computing system.

FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 701. The components of the computing system 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, content control software 706, content control data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computing system 701 typically comprises a variety of computer readable media. Exemplary readable media can be any available media that is accessible by the computing system 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as content control data 707 and/or program modules such as operating system 705 and content control software 706 that are immediately accessible to and/or are presently operated on by the processing unit 703.

In another aspect, the computing system 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computing system 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and content control software 706. Each of the operating system 705 and content control software 706 (or some combination thereof) can comprise elements of the programming and the content control software 706. Content control data 707 can also be stored on the mass storage device 704. Content control data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 707 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing system 701 can have more than one display adapter 709 and the computing system 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing system 701 via Input/Output Interface 710. Any step and/or result of the methods can be output in any form to an output device. Such output can be any form of visual representation, including, but not limited to, textual, graphical, animation, audio, tactile, and the like. The display 711 and computing system 701 can be part of one device, or separate devices.

The computing system 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computing system 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing system 701, and are executed by the data processor(s) of the computer. An implementation of content control software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
providing a first content transmission to a first device and a second device at a first time;
providing a second content transmission to the first device at a second time in place of the first content transmission, wherein the second time is determined randomly;
providing the second content transmission to the second device at a third time in place of the first content transmission; and
providing the first content transmission to the first device and the second device at a fourth time in place of the second content transmission.

2. The method of claim 1, wherein the first content transmission comprises local video programming.

3. The method of claim 2, wherein the second content transmission comprises national video programming.

4. The method of claim 1, wherein the second time is different from the third time.

5. The method of claim 1, wherein the first device is associated with a first identifier and the second device is associated with a second identifier.

6. The method of claim 5, wherein one or more of the first identifier and the second identifier comprises information relating to a geographical region, a type of device, a class of device, a class of user, a class of service, a time zone, or a combination thereof.

7. The method of claim 1, wherein the first device is located in a same time zone as the second device.

8. The method of claim 1, wherein providing the second content transmission to the second device at the third time in place of the first content transmission comprises one or more of adding closed captioning data to the second content transmission, adding an auxiliary audio channel to the second content transmission, inserting a bug in the second content transmission, and smoothing audio transitions in the second content transmission.

9. A method comprising:
   providing first content to a plurality of devices at a first time;
   determining which of the plurality of devices are associated with a first identifier and which of the plurality of devices are associated with a second identifier;
   providing second content to a first device of the plurality of devices determined to be associated with the first identifier at a second time, wherein the second time is determined randomly;
   providing the second content to a second device of the plurality of devices determined to be associated with the second identifier at a third time; and
   providing third content to the plurality of devices at a fourth time.

10. The method of claim 9, wherein the second time is different from the third time.

11. The method of claim 9, wherein one or more of the first identifier and the second identifier comprises information relating to a geographical region, a type of device, a class of device, a class of user, a class of service, a time zone, or a combination thereof.

12. The method of claim 9, wherein providing the second content to the second device of the plurality of devices determined to be associated with the second identifier at the third time comprises one or more of adding closed captioning data to the second content transmission, adding an auxiliary audio channel to the second content transmission, inserting a bug in the second content transmission, and smoothing audio transitions in the second content transmission.

13. The method of claim 9, wherein the first device of the plurality of devices determined to be associated with the first identifier is located in a same time zone as the second device of the plurality of devices determined to be associated with the second identifier.

14. A method comprising:
   determining a first time dependent transition in a first data transmission;
   receiving a common data transmission to be provided at the first time dependent transition;
   storing the common data transmission;
   providing a secondary data transmission at the first time dependent transition in lieu of the common data transmission for a delay time period; and
   providing the stored common data transmission after an expiration of the delay time period.

15. The method of claim 14, further comprising:
   determining a second time dependent transition in the secondary data transmission; and
   providing a common content block prior to the second time dependent transition in lieu of the common data transmission.

16. The method of claim 15, wherein one or more of the secondary data transmission and the common content block comprises an advertisement.

17. The method of claim 14, wherein the first data transmission comprises a sequence that is different from a first sequence and a second sequence of the second content transmission.

18. The method of claim 14, further comprising:
   determining which of a plurality of recipient devices are associated with a first identifier and which of the plurality of recipient devices are associated with a second identifier:
   providing the common data transmission at the first time dependent transition to a first device of the plurality of recipient devices associated with the first identifier; and
   providing the secondary data transmission at the first time dependent transition to a second device of the plurality of recipient devices associated with the second identifier.

19. The method of claim 18, wherein one or more of the first identifier and the second identifier comprises information relating to a geographical region, a type of device, a class of device, a class of user, a class of service, a time zone, or a combination thereof.

20. The method of claim 19, wherein the first device of the plurality of recipient devices determined to be associated with the first identifier is located in a same time zone as the second device of the plurality of recipient devices determined to be associated with the second identifier.

* * * * *